(12) United States Patent
Maekubo et al.

(10) Patent No.: US 9,212,024 B2
(45) Date of Patent: Dec. 15, 2015

(54) WEBBING RETRACTOR

(71) Applicant: KABUSHIKI KAISHA TOKAI-RIKA-DENKI-SEISAKUSHO, Aichi-ken (JP)

(72) Inventors: Yoshiaki Maekubo, Aichi-ken (JP); Masaru Ukita, Aichi-ken (JP); Wataru Yanagawa, Aichi-ken (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 339 days.

(21) Appl. No.: 13/677,725

(22) Filed: Nov. 15, 2012

(65) Prior Publication Data
US 2013/0126656 A1    May 23, 2013

(30) Foreign Application Priority Data
Nov. 18, 2011    (JP) .................. 2011-253057

(51) Int. Cl.
*B65H 75/48*    (2006.01)
*B60R 22/34*    (2006.01)
*B60R 22/28*    (2006.01)

(52) U.S. Cl.
CPC ............ *B65H 75/48* (2013.01); *B60R 22/3413* (2013.01); *B60R 2022/287* (2013.01); *B60R 2022/288* (2013.01)

(58) Field of Classification Search
USPC .............. 242/379, 379.1; 280/805, 807; 297/470–472, 475–478
See application file for complete search history.

(56) References Cited

U.S. PATENT DOCUMENTS

| | | | |
|---|---|---|---|
| 5,779,176 A * | 7/1998 | Hori et al. | 242/379.1 |
| 6,047,914 A * | 4/2000 | Sasaki | 242/379.1 |
| 6,367,729 B1 * | 4/2002 | Inagawa et al. | 242/379.1 |
| 6,405,962 B1 * | 6/2002 | Hirase | 242/379.1 |
| 7,273,191 B2 | 9/2007 | Clute et al. | |
| 2002/0038834 A1 * | 4/2002 | Mishina et al. | 242/379.1 |
| 2011/0031340 A1 | 2/2011 | Maekubo et al. | |

FOREIGN PATENT DOCUMENTS

JP    2012-180040    9/2012

OTHER PUBLICATIONS

JP Office Action dated Sep. 30, 2014 and Notice of Reasons for Rejection.

* cited by examiner

*Primary Examiner* — Emmanuel M Marcelo
*Assistant Examiner* — Angela Caligiuri
(74) *Attorney, Agent, or Firm* — Roberts Mlotkowski Safran & Cole, PC

(57) ABSTRACT

A webbing retractor is provided that can improve balance of load that a torsion shaft receives from a spool. Fit-together projections are formed at a spool side engaging portion of a main torsion member. Further, a load receiving portion is formed at a webbing insert-through hole side at the spool side engaging portion. Rotation radius direction components of rotational forces, that respective inclined surfaces of the fit-together projections receive from respective inclined surfaces of rotation restricting holes, are nullified by a rotation radius direction component of rotational force that the load receiving portion receives from a load imparting portion. Due thereto, balance of load that the main torsion member receives from a spool can be improved.

8 Claims, 6 Drawing Sheets

WEBBING RETRACTOR

CROSS-REFERENCE TO RELATED APPLICATION

This application claims priority under 35 USC 119 from Japanese Patent Application No. 2011-253057 filed Nov. 18, 2011, the disclosure of which is incorporated by reference herein.

BACKGROUND OF THE INVENTION

1. Field of the Invention

The present invention relates to a webbing retractor that structures a seatbelt device of a vehicle.

2. Related Art

In a webbing retractor such as that disclosed in U.S. Pat. No. 7,273,191 for example, a distance from a webbing insert-through hole at a spool to the central axis of the spool is set to be short in order to aim for compactness of the spool and the like. Therefore, in such a webbing retractor, the webbing insert-through hole communicates with a torsion shaft accommodating hole in which the torsion shaft is provided at the spool. In such a structure, a portion of the torsion shaft, which portion is connected to the spool, is not set at the webbing insert-through hole side, so that the connected portion of the torsion shaft and the spool does not interfere with the webbing.

The portion of the torsion shaft, which portion is connected to the spool, is structured by a projection that is formed radially with respect to the central axis of the torsion shaft. A rotational force in the pull-out direction that the projection receives from the spool is divided into a component in the rotation tangent direction and a component in the rotation radius direction toward the central side. Here, because the projection is not set at the webbing insert-through hole side, the component of the rotation radius direction central side of the rotational force that the projection receives pushes the torsion shaft toward the webbing insert-through hole side. Therefore, there still remains room for improvement from the standpoint of the balance of the load that the torsion shaft receives from the spool.

SUMMARY OF THE INVENTION

In consideration of the above-described circumstances, the present invention is to provide a webbing retractor that can improve the balance of the load that a torsion shaft receives from a spool.

A webbing retractor relating to a first aspect of the present invention has: a spool in which a webbing insert-through hole through which a webbing is inserted and a torsion shaft accommodating hole which passes through the spool along a central axis of the spool and in which a torsion shaft is accommodated are formed, in which both ends of the webbing insert-through hole are open at an outer peripheral surface of the spool, the webbing which is inserted-through from one end of the webbing insert-through hole is anchored at another end of the webbing insert-through hole, the webbing insert-through hole communicates with the torsion shaft accommodating hole, rotation restricting portions, whose inner peripheral shape is a concave shape that opens toward the central axis, are formed at at least a portion of the torsion shaft accommodating hole, and a load imparting portion, that is inclined inwardly in a radial direction whose center is the central axis with respect to an around direction of the central axis, is formed at a communication portion at an inner peripheral portion of the webbing insert-through hole with an inner peripheral portion of the torsion shaft accommodating hole; a locking unit that has a lock base that can rotate relative to the spool, and that restricts, by operating, rotation of the lock base in a direction corresponding to a pull-out direction that is a rotating direction of the spool when the webbing is pulled-out from the spool; and a torsion shaft whose one end side is connected to the lock base in a state in which relative rotation with respect to the lock base is restricted, and at which fit-together projections and a load receiving portion are formed further toward another end side of the torsion shaft than a portion of the torsion shaft connected to the lock base, in which the fit-together projections are formed to project-out from an outer peripheral portion of a main body portion of the torsion shaft so as to fit-in the rotation restricting portions respectively, and the load receiving portion, a portion of an outer peripheral surface of which is inclined outwardly in the radial direction with respect to the around direction, and is formed to project-out from the outer peripheral portion of the main body portion so as to face the load imparting portion.

In the webbing retractor relating to the first aspect of the present invention, the torsion shaft is provided in the torsion shaft accommodating hole of the spool. The torsion shaft is connected, at one end side thereof, to the lock base in a state in which relative rotation with respect to the lock base, that structures the locking unit, is restricted. In contrast, at a portion of the torsion shaft, which portion is further toward the other end side than the portion connected to the lock base, the fit-together projections are formed to project-out from the outer peripheral portion of the main body portion of the torsion shaft. The rotation restricting portions are formed at the torsion shaft accommodating hole of the spool, in correspondence with the fit-together projections.

The rotation restricting portion is made to be a concave shape that opens toward the central axis side of the spool, and the fit-together projection fits-in the inner side of this rotation restricting portion. When the torsion shaft attempts to rotate relative to the spool, the inner peripheral portion of the rotation restricting portion (in particular, the surface directing in the central axis around direction) interferes with the fit-together projection. Due thereto, relative rotation of the fit-together projection with respect to the spool, and accordingly, relative rotation of the torsion shaft with respect to the spool, is restricted.

Therefore, when the locking unit operates and rotation of the lock base in the pull-out direction is restricted, rotation of the spool in the pull-out direction is restricted via the torsion shaft. Due thereto, pulling-out of the webbing from the spool is restricted.

On the other hand, in the state in which rotation of the lock base in the pull-out direction is restricted, when rotational force in the pull-out direction (i.e., pulling force that attempts to pull the webbing out), that exceeds the mechanical strength between the connected portions of both the lock base and the spool at the torsion shaft, is imparted to the spool, torsional deformation arises at the torsion shaft between the connected portions of both the lock base and the spool. A portion of the rotational force in the pull-out direction that is imparted to the spool (i.e., the pulling force that attempts to pull the webbing out) is used for this torsional deformation of the torsion shaft and is absorbed. Moreover, the spool rotates in the pull-out direction by an amount corresponding to the amount of torsional deformation of the torsion shaft, and the webbing is pulled-out from the spool by an amount corresponding to the amount of rotation of the spool, and the vehicle occupant, who has put-on the webbing, can move toward the vehicle front.

When rotational force in the pull-out direction is imparted to the spool, the rotation restricting portion pushes the fit-together projection in the pull-out direction. This pushing force is inclined toward the central axis side of the spool, with respect to the pull-out direction. Because the webbing insert-through hole communicates with the torsion shaft accommodating hole, the inner peripheral portion of the torsion shaft does not exist at the portion where the torsion shaft accommodating hole and the webbing insert-through hole communicate with one another, and the rotation restricting portion is not formed at this portion.

Therefore, at the communication portion where the torsion shaft accommodating hole and the webbing insert-through hole communicate with one another, force, that the rotation restricting portion imparts to the fit-together projection, does not arise. However, the load imparting portion is formed at a communication portion at an inner peripheral portion of the webbing insert-through hole with an inner peripheral portion of the torsion shaft accommodating hole. The load receiving portion is formed so as to project-out from the outer peripheral portion of the main body portion of the torsion shaft, in correspondence with this load imparting portion. The load imparting portion is inclined, inwardly in the radial direction that is centered about the central axis, with respect to the central axis around direction (the peripheral direction of the spool).

In contrast, a portion of the outer peripheral surface of the load receiving portion is inclined outwardly in the radial direction with respect to the central axis around direction. Therefore, when rotational force in the pull-out direction is imparted to the spool, the load imparting portion pushes the load receiving portion toward the radial direction inner side (the central axis side) with respect to the pull-out direction. The radial direction component of this pushing force works so as to be against (oppose) the radial direction component of the force by which the rotation restricting portion pushes the fit-together projection. Therefore, displacement of the torsion shaft, toward the side at which the torsion shaft accommodating hole and the webbing insert-through hole communicate with one another, can be prevented or suppressed.

In a webbing retractor relating to a second aspect of the present invention, in the first aspect of the present invention, an imaginary line that connects a fit-together projection side intersection point, that is a point of intersection of the outer peripheral portion of the main body portion of the torsion shaft and an outer peripheral portion of the fit-together projection, and the central axis, is a fit-together projection side first imaginary line, an imaginary line, that connects a fit-together projection side contact point, that is a point of contact of the outer peripheral portion of the fit-together projection and an inner peripheral portion of the rotation restricting portion, and the fit-together projection side intersection point, is a fit-together projection side second imaginary line, an imaginary line, that connects a load receiving portion side intersection point, that is a point of intersection of the outer peripheral portion of the main body portion of the torsion shaft and an outer peripheral portion of the load receiving portion, and the central axis, is a load receiving portion side first imaginary line, an imaginary line, that connects a load receiving portion side contact point, that is a point of contact of the outer peripheral portion of the load receiving portion and an inner peripheral portion of the load imparting portion, and the load receiving portion side intersection point, is a load receiving portion side second imaginary line, and an angle, that the load receiving portion side first imaginary line and the load receiving portion side second imaginary line form, is set to be smaller than an angle that the fit-together projection side first imaginary line and the fit-together projection side second imaginary line form.

In the webbing retractor relating to the second aspect of the present invention, the outer peripheral shape of the fit-together projection and the outer peripheral shape of the load receiving portion, and the inner peripheral shape of the rotation restricting portion and the shape of the load imparting portion, are set as follows.

Namely, the imaginary line that connects a fit-together projection side intersection point, that is a point of intersection of the outer peripheral portion of the main body portion of the torsion shaft and an outer peripheral portion of the fit-together projection, and the central axis, is a fit-together projection side first imaginary line, and the imaginary line, that connects a fit-together projection side contact point, that is a point of contact of the outer peripheral portion of the fit-together projection and an inner peripheral portion of the rotation restricting portion, and the fit-together projection side intersection point, is a fit-together projection side second imaginary line.

On the other hand, the imaginary line, that connects a load receiving portion side intersection point, that is a point of intersection of the outer peripheral portion of the main body portion of the torsion shaft and an outer peripheral portion of the load receiving portion, and the central axis, is a load receiving portion side first imaginary line, and the imaginary line, that connects a load receiving portion side contact point, that is a point of contact of the outer peripheral portion of the load receiving portion and an inner peripheral portion of the load imparting portion, and the load receiving portion side intersection point, is a load receiving portion side second imaginary line.

Here, in the webbing retractor relating to the present invention, the outer peripheral shape of the fit-together projection and the outer peripheral shape of the load receiving portion, and the inner peripheral shape of the rotation restricting portion and the shape of the load imparting portion, are set such that the angle, that the load receiving portion side first imaginary line and the load receiving portion side second imaginary line form, is smaller than the angle that the fit-together projection side first imaginary line and the fit-together projection side second imaginary line form. Due thereto, even if the projecting dimension of the load receiving portion is short as compared with the projecting dimension of the fit-together projection, when the inner wall of the rotation restricting hole abuts the distal end side of the fit-together projection, the load imparting portion can be made to abut the load receiving portion, and load in the pull-out direction can be transmitted from the load imparting portion to the load receiving portion.

It is possible in the first aspect or the second aspect that a projecting dimension in the radial direction of the load receiving portion from the outer peripheral portion of the main body portion of the torsion shaft is set to be shorter than a projecting dimension in the radial direction of the fit-together projection from the outer peripheral portion of the main body portion of the torsion shaft.

It is possible in the first aspect or the second aspect that a distal end in a projecting direction of the load receiving portion does not project-out further toward an inner side of the webbing insert-through hole than a surface of the webbing insert-through hole, which surface is at the central axis side of the spool.

It is possible in the first aspect or the second aspect that the load receiving portion includes, as the portion of the outer peripheral surface thereof, a load receiving surface which is an inclined surface formed at a side of a take-up direction opposite to the pull-out direction, and the load receiving surface faces the load imparting portion.

As described above, the webbing retractor relating to the present invention can improve the balance of the load that a torsion shaft receives from a spool.

BRIEF DESCRIPTION OF THE DRAWINGS

Embodiments of the invention will be described in detail with reference to the following figures, wherein.

DETAILED DESCRIPTION OF THE INVENTION

<Structure of the Embodiment>

Figure 1:
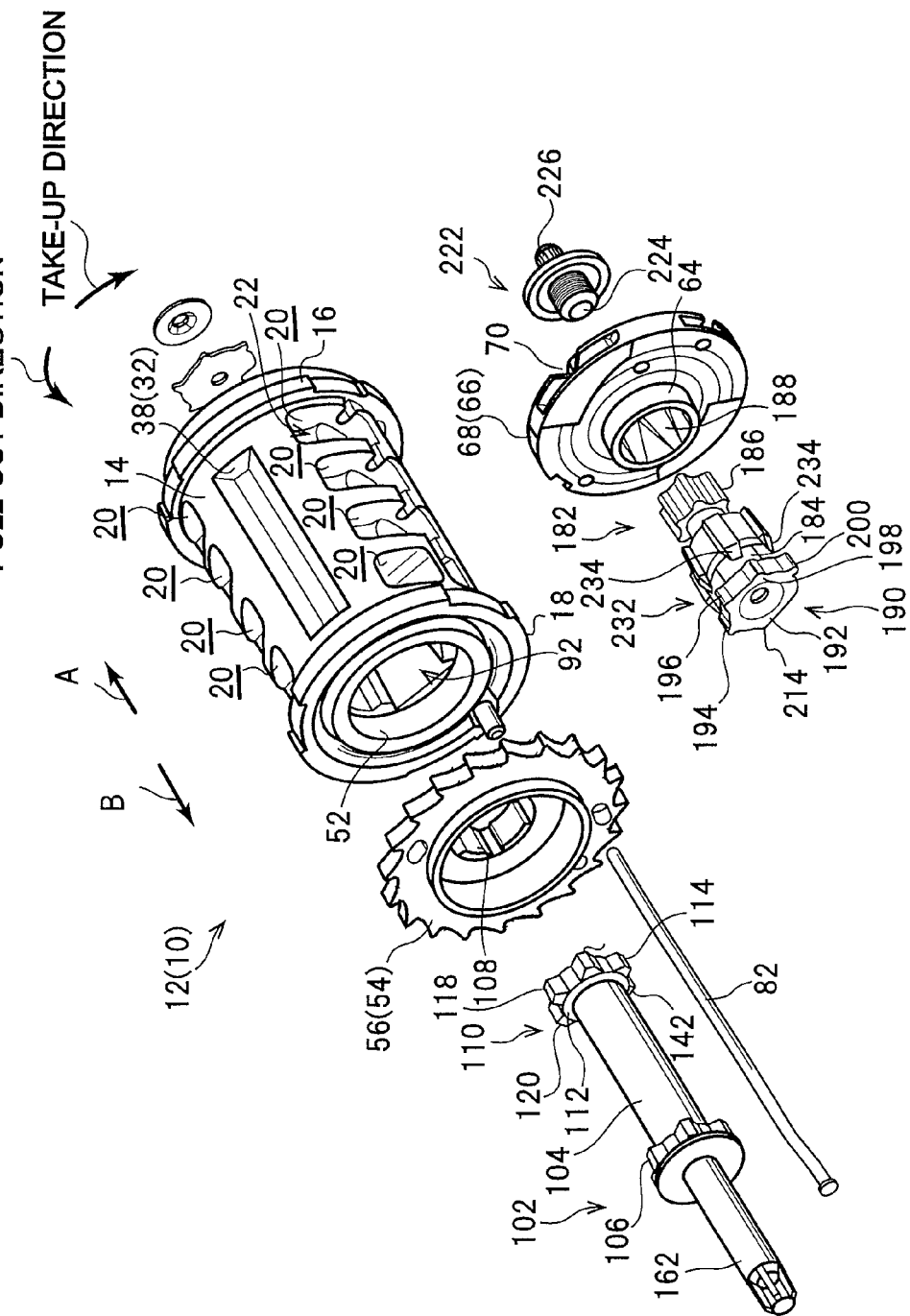
FIG. 1 is an exploded perspective view of a shaft assembly that is a main portion of a webbing retractor relating to an embodiment of the present invention.

The structure of a shaft assembly 12, that is a main portion of a webbing retractor 10 relating to an embodiment of the present invention, is shown in FIG. 1 in an exploded perspective view.

As shown in FIG. 1, the shaft assembly 12 of the present webbing retractor 10 has a spool 14. The spool 14 is formed overall in a substantially cylindrical tube shape. At an axial direction one end side (the arrow A direction side in FIG. 1) at the spool 14, a flange portion 16 extends substantially coaxially from the main body portion of the spool 14 toward the radial direction outer side. In contrast, at the axial direction other end side (the arrow B direction side in FIG. 1) of the spool 14, a flange portion 18 that is thicker than the flange portion 16 extends substantially coaxially from the main body portion of the spool 14 toward the radial direction outer side.

Lightening portions 20 are set at the spool 14 between the flange portion 16 and the flange portion 18. The plural lightening portions 20 are formed so as to form rows in the direction along the central axis of the spool 14, and further, plural rows of these lightening portions 20 are formed in the peripheral direction of the spool 14. One row of these lightening portions 20 is a trigger accommodating portion 22 and accommodates a trigger wire 82 that is described later.

Figure 2:
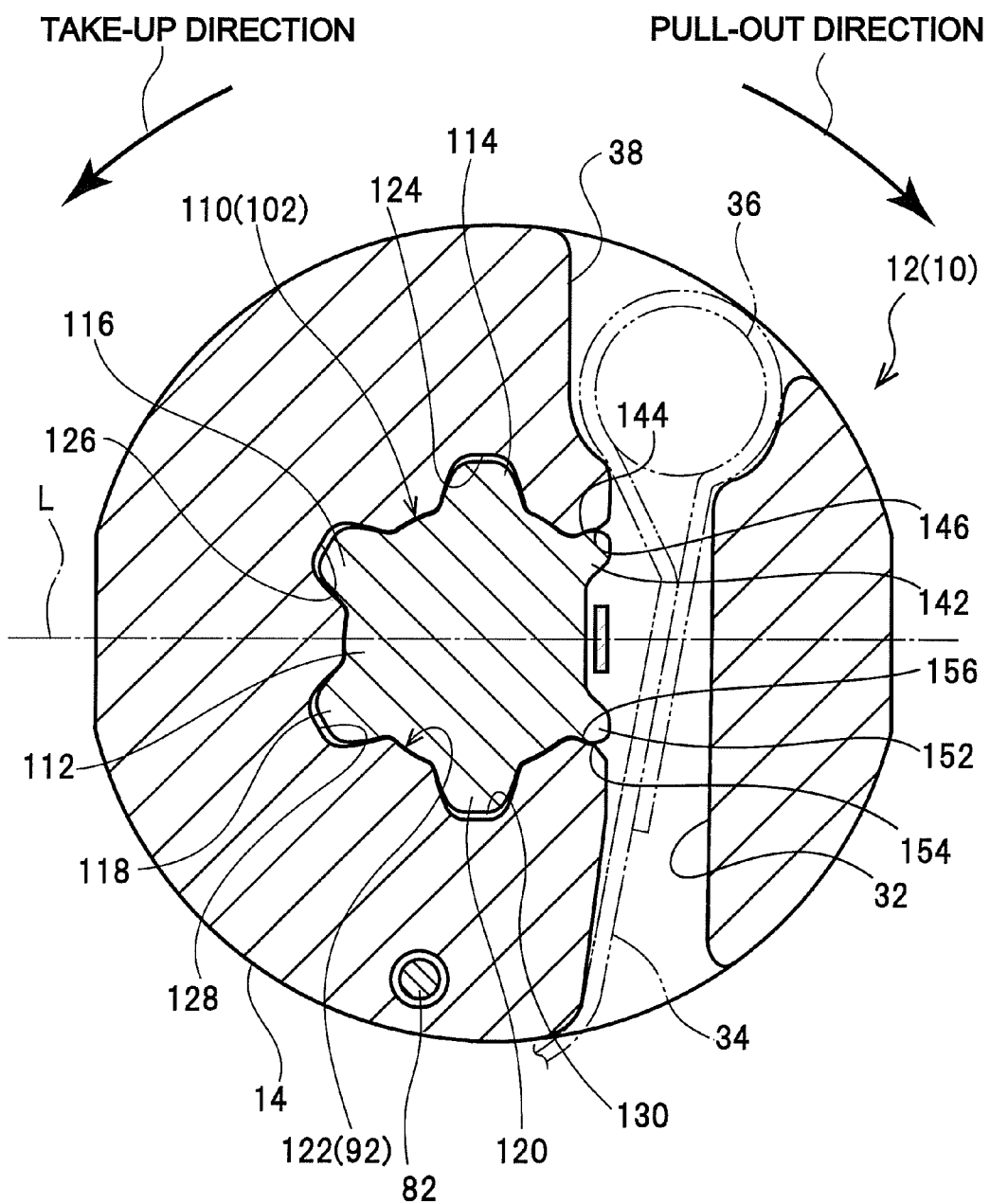
FIG. 2 is a cross-sectional view along line 2-2 of FIG. 6.
Figure 5:
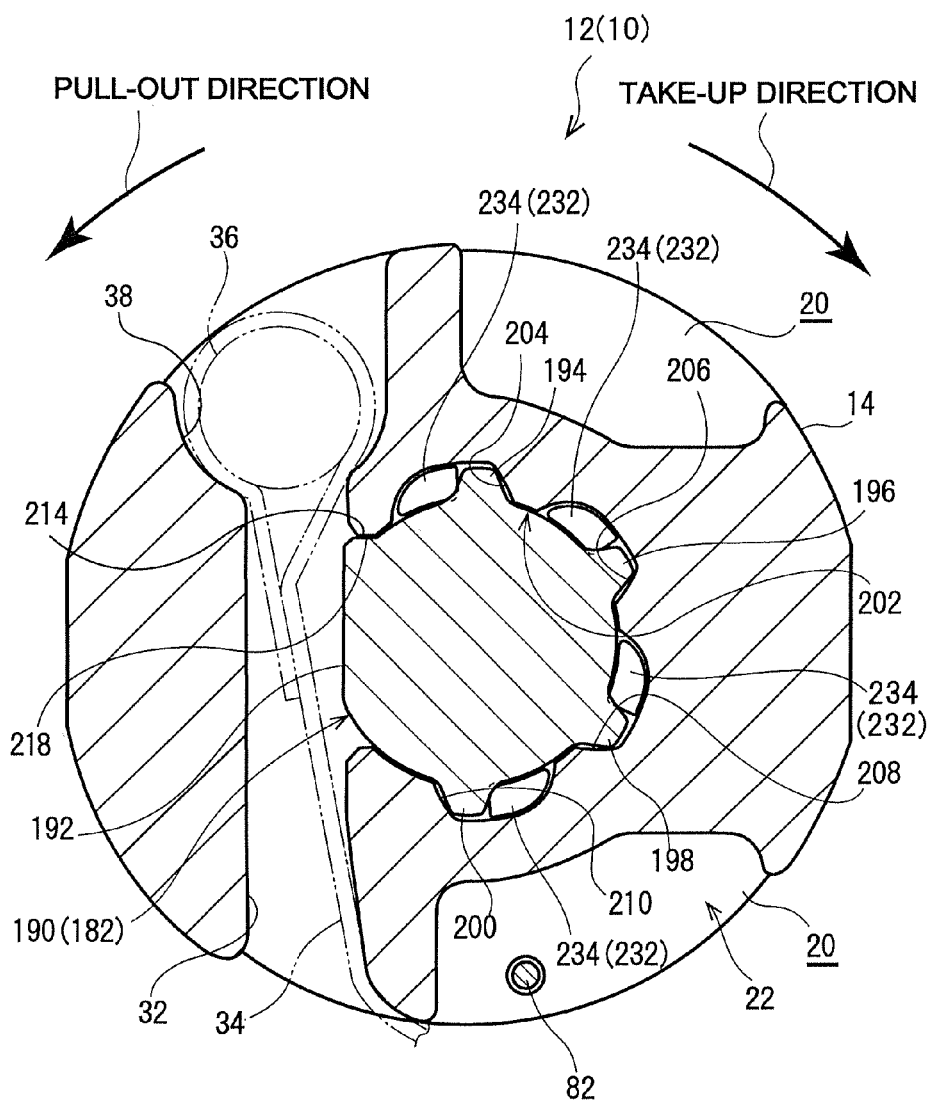
FIG. 5 is a cross-sectional view along line 5-5 of FIG. 6.

Further, a webbing insert-through hole 32 is formed in the spool 14. As shown in FIG. 2 and FIG. 5, the webbing insert-through hole 32 is formed in the shape of a slit that is long in a direction running along the central axis of the spool 14, and passes-through such that both ends thereof open at the outer peripheral portion of the spool 14. Further, as shown in FIG. 2 and FIG. 5, the position at which the webbing insert-through hole 32 is formed is set such that, although the webbing insert-through hole 32 passes-through rectilinearly in a direction orthogonal to the direction of the central axis of the spool 14, the webbing insert-through hole 32 avoids the axially central portion of the spool 14 and the vicinity thereof.

As shown in FIG. 2 and FIG. 5, the longitudinal direction proximal end side of a webbing 34, that is flexible and is formed in the shape of an elongated strip, passes-through the webbing insert-through hole 32 from one opening end side of the webbing insert-through hole 32. In a state in which the proximal end side portion of the webbing 34 is folded-over toward the distal end side, portions of the webbing 34 that are further toward the proximal end side and the distal end side than this folded-over portion are superposed on one another and sewn together. At the webbing 34, the portion further toward the proximal end side than this sewn-together portion is loop-shaped, and a rod-shaped stopper 36 is accommodated at the inner side thereof. At the webbing insert-through hole 32, the opening width, along the peripheral direction of the spool 14, of the one opening end is set to be larger than twice the thickness of the webbing 34, and smaller than the sum of the diameter of the stopper 36 and twice the thickness of the webbing 34.

Moreover, as shown in FIG. 2 and FIG. 5, a stopper accommodating portion 38 is set at the other opening end side of the webbing insert-through hole 32. The opening width of the other opening end of the webbing insert-through hole 32, along the peripheral direction of the spool 14, is set to be longer than that of the one opening end, and is set to be larger than the sum of the diameter of the stopper 36 and twice the thickness of the webbing 34. The loop portion at the longitudinal direction proximal end side of the webbing 34 is accommodated at the inner side of the stopper accommodating portion 38, in a state in which the stopper 36 is accommodated at the inner side of the loop portion. Due thereto, the longitudinal direction proximal end side of the webbing 34 is anchored at the spool 14, without the loop portion of the webbing 34 coming-out toward the one opening end side of the webbing insert-through hole 32.

Due to the spool 14 rotating in the take-up direction that is one direction around the central axis thereof, the webbing 34, whose longitudinal direction proximal end side is anchored at the spool 14 in this way, is taken-up in layers and stored on the outer peripheral portion of the spool 14. Further, when the webbing 34 is pulled toward the distal end side thereof, the spool 14 rotates in a pull-out direction, that is opposite to the take-up direction, while the webbing 34 is pulled-out from the spool 14.

Figure 6:
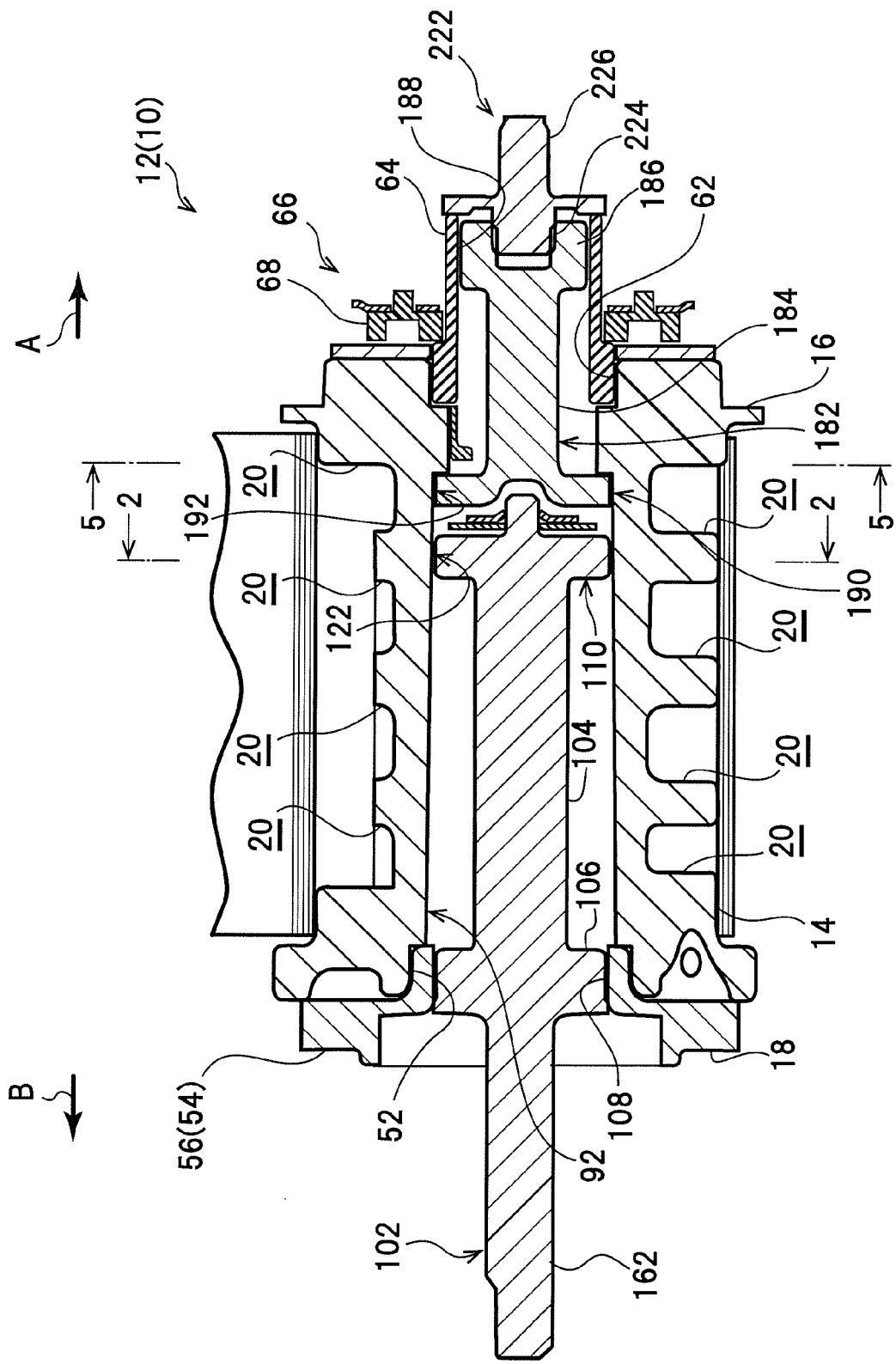
FIG. 6 is a cross-sectional view of the shaft assembly that is a main portion of the webbing retractor relating to the embodiment of the present invention.

On the other hand, as shown in FIG. 1 and FIG. 6, a fitting/insertion hole 52 is formed in the axial direction other end side (the arrow B direction side in FIG. 1 and FIG. 6) of the spool 14. The inner peripheral shape of the fitting/insertion hole 52 is made to be a circular shape that is coaxial with the spool 14, and the fitting/insertion hole 52 opens at the axial direction other end portion of the spool 14. A lock base 56, that structures a first locking mechanism 54 that serves as a locking section, is fit into the fitting/insertion hole 52 so as to be able to rotate around the central axis of the fitting/insertion hole 52 (i.e., around the central axis of the spool 14). An unillustrated lock pawl, that, together with the lock base 56, structures the first locking mechanism 54, is provided at the rotation radius direction outer side of the lock base 56.

This lock pawl is provided so as to be swingable around a shaft whose axial direction is the same direction as the axial direction of the spool 14, at a leg plate, that is provided at the axial direction other end side of the spool 14, of an unillustrated frame that structures the webbing retractor 10. When the lock pawl swings so as to approach the outer peripheral portion of the lock base 56, and the lock pawl engages with a ratchet tooth formed at the outer peripheral portion of the lock base 56, rotation of the lock base 56 in the pull-out direction is restricted. Further, a housing, that structures the first locking mechanism 54, is mounted to the leg plate at which this lock pawl is provided.

Various parts, that structure a so-called "VSIR mechanism" that operates in response to the acceleration (deceleration) of the vehicle at the time when the vehicle in which the present webbing retractor 10 is installed decelerates rapidly, and various parts, that structure a so-called "WSIR mechanism" that operates when the acceleration at the time when the spool 14 rotates in the pull-out direction is greater than or equal to a predetermined magnitude, are accommodated at the inner side of this housing. Due to this "VSIR mechanism" or "WSIR mechanism" operating, the above-described lock pawl swings so as to approach the outer peripheral portion of the lock base 56.

On the other hand, as shown in FIG. 6, a fitting/insertion hole 62 is formed in the axial direction one end side (the arrow A direction side in FIG. 1) of the spool 14. The inner peripheral shape of the fitting/insertion hole 62 is made to be a circular shape that is coaxial with the spool 14, and the fitting/insertion hole 62 opens at the axial direction one end portion of the spool 14. A sleeve 64 is fit into this fitting/insertion hole 62 so as to be able to rotate around the central axis of the fitting/insertion hole 62 (i.e., the central axis of the spool 14).

As shown in FIG. 1, a clutch 68, that structures a second locking mechanism 66 that serves as a locking section, is provided at the sleeve 64. This clutch 68 is supported at the sleeve 64 in a state in which relative rotation with respect to the sleeve 64 is restricted. A base member of the second locking mechanism is mounted in correspondence with the clutch 68 to the leg plate, that is provided at the axial direction one end side of the spool 14, of the above-described frame. A ring member, that can rotate coaxially with respect to the spool 14, is provided at this base member.

The above-described clutch 68 is provided at the inner side of this ring member. When a pawl 70 that is provided at the clutch 68 operates, the pawl 70 connects the clutch 68 and the ring member, and relative rotation of the clutch 68 in the pull-out direction with respect to the ring member is restricted. Further, a lock member that, by operating, restricts rotation of the ring member in the pull-out direction, is provided at the base member. When the body weight of the vehicle occupant, who is seated in the seat that corresponds to the present webbing retractor 10, is greater than or equal to a predetermined magnitude and further the vehicle enters into a state of rapid deceleration, the lock member restricts rotation of the ring member.

The pawl 70, that is provided at the above-described clutch 68, is urged in a direction of engaging with the ring member, and, in an initial state, the distal end side of the trigger wire 82 is engaged with the pawl 70, and displacement of the pawl 70 in the direction of engaging with the ring member is restricted. The trigger wire 82 is formed overall in the shape of a rod or the shape of a wire whose axial direction is the same direction as the axial direction of the spool 14, and is accommodated in the above-described trigger accommodating portion 22. The longitudinal direction distal end side of the trigger wire 82 projects-out from the axial direction one end (the end portion at the clutch 68 side) of the spool 14, and is entered into the clutch 68. When the trigger wire 82 moves toward the axial direction other end (the end portion at the lock base 56 side) side of the spool 14 and comes-out of the clutch 68, the engagement of the trigger wire 82 with respect to the pawl 70 of the clutch 68 is cancelled, and the pawl 70 of the clutch 68 approaches the ring member and engages with the ring member due to urging force.

On the other hand, the longitudinal direction proximal end portion of the trigger wire 82 projects-out from the axial direction other end (the end portion at the lock base 56 side) of the spool 14, and is anchored on the lock base 56. When the spool 14 rotates in the pull-out direction relative to the lock base 56, in accordance with the amount of this relative rotation, the trigger wire 82 is pulled-out from the trigger accommodating portion 22 toward the axial direction other end side of the spool 14, and, due thereto, the distal end side of the trigger wire 82 comes-out from the clutch 68.

Further, as shown in FIG. 1 and FIG. 6, a torsion shaft accommodating hole 92 is formed in the spool 14. As shown in FIG. 6, one end of the torsion shaft accommodating hole 92 opens at the bottom portion of the fitting/insertion hole 62, and the other end opens at the bottom portion of the fitting/insertion hole 52. Moreover, as shown in FIG. 2 and FIG. 5, the above-described webbing insert-through hole 32 overlaps the torsion shaft accommodating hole 92 at the side direction side of the central axis of the spool 14 at the torsion shaft accommodating hole 92.

As shown in FIG. 1, FIG. 2 and FIG. 6, a main torsion member 102 that serves as a torsion shaft is provided at the inner side of this torsion shaft accommodating hole 92. As shown in FIG. 1 and FIG. 6, the main torsion member 102 has a main torsion member main body 104. In the present embodiment, the main torsion member main body 104 is shaped as a rod whose cross-sectional shape is circular and whose axial direction is the same direction as the axial direction of the spool 14. A lock base side engaging portion 106 is formed at the end portion at the lock base 56 side of the main torsion member main body 104. The outer peripheral shape of the lock base side engaging portion 106 is a non-circular shape, such as a polygonal shape, a star shape, a gear shape, a serrated shape, or the like.

An engaging hole 108 is formed in the lock base 56 in correspondence with the lock base side engaging portion 106. The inner peripheral shape of the engaging hole 108 is made to be the same shape as (strictly speaking, a similar shape that is slightly larger than) the outer peripheral shape of the lock base side engaging portion 106. Due to the lock base side engaging portion 106 being fit into the engaging hole 108, relative rotation of the lock base 56 with respect to the main torsion member 102 is restricted.

A spool side engaging portion 110 is provided at the end portion of the main torsion member main body 104, which end portion is at the side opposite the lock base side engaging portion 106. Here, as shown in FIG. 2, the spool side engaging portion 110 has an engaging portion main body 112 whose outer peripheral shape is larger than the outer peripheral shape of the main torsion member main body 104. Plural (four in the present embodiment) fit-together projections 114, 116, 118, 120 are formed at the engaging portion main body 112.

These fit-together projections 114 through 120 are formed so as to project from the outer peripheral portion of the engaging portion main body 112 in a radial form from the central axis of the main torsion member 102 toward the radial direction outer side. In particular, the direction in which the fit-together projection 114 projects-out from the engaging portion main body 112 is the same direction as one of the pass-through directions (the direction at the stopper accommodating portion 38 side) of the webbing insert-through hole 32. The direction in which the fit-together projection 120 projects-out from the engaging portion main body 112 is the same direction as the other of the pass-through directions (the direction at the side opposite the stopper accommodating portion 38) of the webbing insert-through hole 32 (i.e., the direction opposite the projecting-out direction of the fit-together projection 114).

The fit-together projection 116 is formed at the pull-out direction side of the fit-together projection 114, and the fit-together projection 118 is formed between the fit-together projection 116 and the fit-together projection 120. Moreover, in the present embodiment, the angle that the projecting direction of the fit-together projection 116 forms with respect to the projecting direction of the fit-together projection 114 around the main torsion member 102, and the angle that the projecting direction of the fit-together projection 118 forms with respect to the projecting direction of the fit-together projection 116 around the main torsion member 102, and the angle that the projecting direction of the fit-together projection 120 forms with respect to the projecting direction of the fit-together projection 118 around the main torsion member 102, are set to be the same angle. Further, the outer peripheral shapes of these fit-together projections 114 through 120 are made to be the same curves as tooth shape (profile) curve of an external tooth of a so-called "involute gear", and the widths thereof gradually become shorter from the central axis of the main torsion member 102 toward the outer side.

Further, an engaging hole 122 is formed in the inner peripheral portion of the torsion shaft accommodating hole 92, in correspondence with these fit-together projections 114 through 120. The inner peripheral shape of the engaging hole 122 is set to be substantially equal to (strictly speaking, slightly larger than) the outer peripheral shape of the spool side engaging portion 110. Rotation restricting holes 124, 126, 128, 130 serving as rotation restricting portions are formed at this engaging hole 122. The respective rotation restricting holes 124 through 130 are formed so as to correspond to the fit-together projections 114 through 120, respectively. In the state in which the engaging portion main body 112 is fit in the engaging hole 122, the fit-together projection 114 is fit in the rotation restricting hole 124, the fit-together projection 116 is fit in the rotation restricting hole 126, the fit-together projection 118 is fit in the rotation restricting hole 128, and the fit-together projection 120 is fit in the rotation restricting hole 130.

Figure 3:
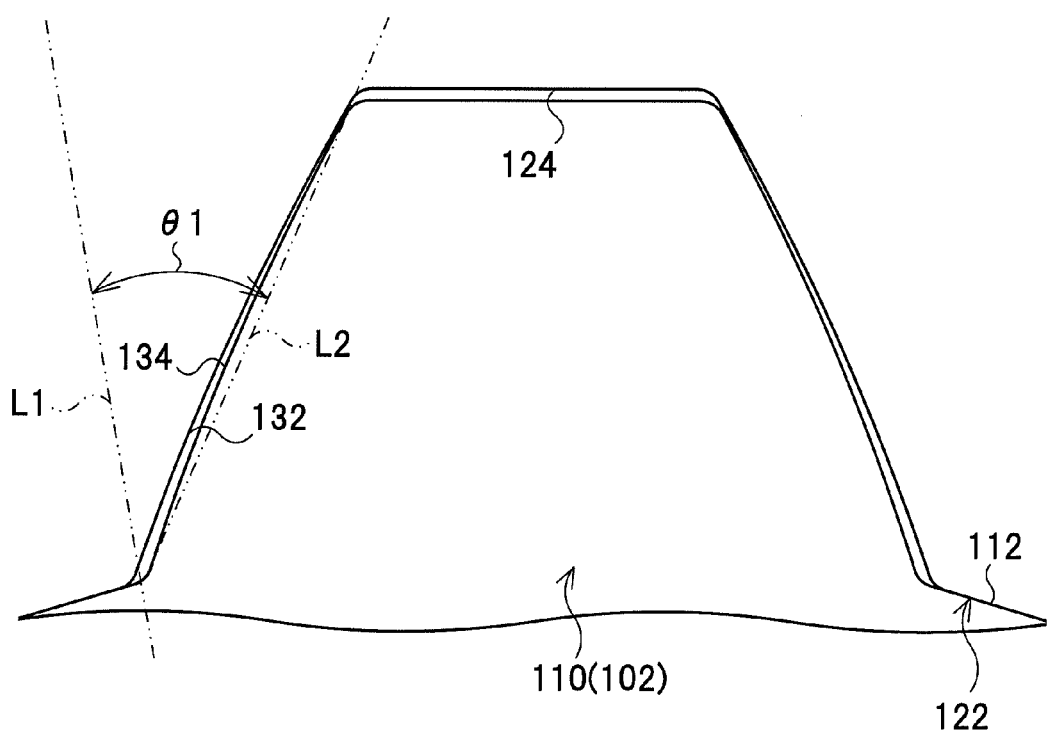
FIG. 3 is an enlarged view of a fit-together projection and a rotation restricting portion.

From the standpoint of molding and from the standpoint of ease of assembly, the respective rotation restricting holes 124 through 130 are formed to be slightly larger than the corresponding fit-together projections 114 through 120. Further, as shown in FIG. 3, an inclined surface 132 at the take-up direction side of the rotation restricting hole 124 is formed so as to, along the direction from the distal end side in the projecting direction toward the proximal end side in the projecting direction of the fit-together projection 114, gradually be apart from an inclined surface 134 at the take-up direction side of the fit-together projection 114.

Further, the relationship between the fit-together projection 116 and the rotation restricting hole 126, the relationship between the fit-together projection 118 and the rotation restricting hole 128, and the relationship between the fit-together projection 120 and the rotation restricting hole 130 are set similarly to the above-described relationship between the fit-together projection 114 and the rotation restricting hole 124, although detailed description thereof is omitted.

Figure 4:
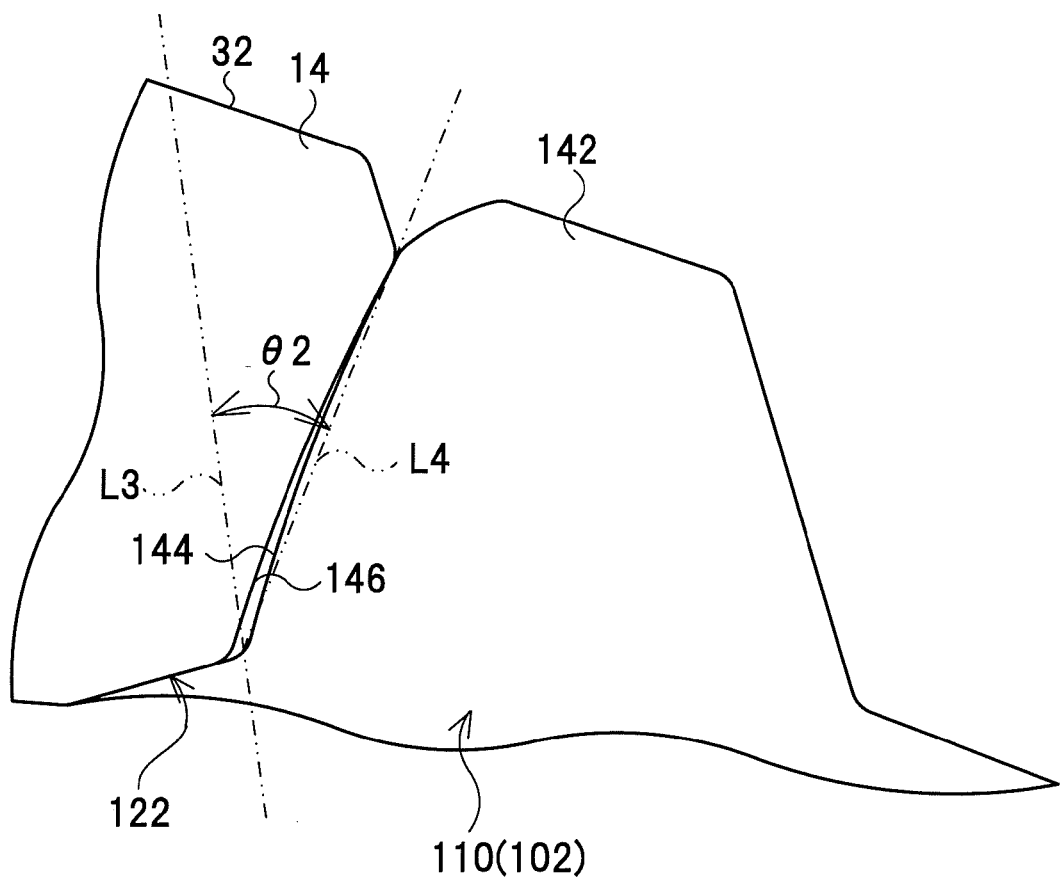
FIG. 4 is an enlarged view of a load receiving portion and a load imparting portion.

On the other hand, as shown in FIG. 2, a load receiving portion 142 is formed to project-out from the outer peripheral surface of the engaging portion main body 112, at the side of the central axis of the main torsion member 102 that is opposite the side at which the fit-together projection 118 is located. As shown in FIG. 4, the projecting dimension of the load receiving portion 142 from the engaging portion main body 112 is set so as to be shorter than the projecting dimensions of the fit-together projections 114 through 120, and the load receiving portion 142 is formed such that the distal end surface in the projecting direction of the load receiving portion 142 does not project-out further toward the inner side of the webbing insert-through hole 32 than the surface of the webbing insert-through hole 32, which surface is at the central axis side of the spool 14. An inclined surface at the take-up direction side of the load receiving portion 142 is a load receiving surface 144.

The load receiving surface 144 is an inclined curved surface that is directed toward the rotation radius direction outer side of the main torsion member 102 with respect to the direction toward the take-up direction around the central axis of the main torsion member 102. A load imparting portion 146 is set at the engaging hole 122 (at a communication portion between the engaging hole 122 and the webbing insert-through hole 32) so as to face the load receiving surface 144. Further, the load imparting portion 146 is formed so as to gradually be apart from the load receiving surface 144, from the projecting direction distal end side toward the projecting direction proximal end side of the load receiving portion 142.

Here, given that an imaginary line that connects the root of the inclined surface 134 of the fit-together projection 114 of the main torsion member 102 (the point of intersection between the inclined surface 134 and the shaft portion (the outer peripheral surface) of the main torsion member 102) and the central axis of the main torsion member 102 (accordingly, the central axis of the spool 14) is imaginary line L1, and that an imaginary line that connects the root of the inclined surface 134 and the position of contact of the inclined surface 134 and the inclined surface 132 at the take-up direction side of the rotation restricting hole 124 is imaginary line L2, an angle that the imaginary line L1 and the imaginary line L2 form is angle θ1 (FIG. 3).

In contrast, given that an imaginary line that connects the root of the load receiving surface 144 of the load receiving portion 142 of the main torsion member 102 (the point of intersection between the load receiving surface 144 and the shaft portion (the outer peripheral surface) of the main torsion member 102) and the central axis of the main torsion member 102 (accordingly, the central axis of the spool 14) is imaginary line L3, and that an imaginary line that connects the root of the load receiving surface 144 and the position of contact of the load receiving surface 144 and the inclined surface at the take-up direction side of the load imparting portion 146 is imaginary line L4, an angle that the imaginary line L3 and the imaginary line L4 form is angle θ2 (FIG. 4).

In the present embodiment, the outer peripheral shapes of the fit-together projection 114 and the load receiving portion 142, the inner peripheral shape of the rotation restricting hole 124, the shape of the load imparting portion 146, and the like are set so that the aforementioned angle θ2 is smaller than the angle θ1.

Further, as shown in FIG. 2, a projection 152 is formed to project-out from the outer peripheral surface of the engaging portion main body 112, at the side of the central axis of the main torsion member 102 that is opposite the side at which the fit-together projection 116 is located. A facing surface 156 is formed at the spool 14 so as to face a facing portion 154 which is at the pull-out direction side of this projection 152. The projection 152, the facing portion 154 and the facing surface 156 are formed in shapes having line symmetry respectively with the load receiving portion 142, the load receiving surface 144 and the load imparting portion 146, across a line (one-dot chain line L in FIG. 2) that intersects the central axis of the main torsion member 102 and that runs along a direction orthogonal to the directions in which the fit-together projection 114 and the fit-together projection 120 project-out from the engaging portion main body 112. (Namely, across the one-dot chain line L, the projection 152 is the mirror image of the load receiving portion 142, and the facing portion 154 is the mirror image of the load receiving surface 144, and the facing surface 156 is the mirror image of the load imparting portion 146.) However, the projection 152 does not function as what is called the "load receiving portion" in the aspects of the present invention, and further, the facing surface 156 does not function as what is called the "load imparting portion" in the aspects.

As shown in FIG. 1, a shaft portion 162 is formed coaxially with the main torsion member main body 104 from the end portion, that is at the side of the lock base side engaging portion 106 opposite the side at which the main torsion member main body 104 is located, of the main torsion member 102 that has such a spool side engaging portion 110. The distal end side of this main torsion member main body 104 is supported so as to rotate freely, either directly or indirectly at the housing of the above-described first locking mechanism 54 or at another part that is mounted to the flange portion 18 side leg plate of the frame separately from this housing.

On the other hand, a sub torsion member 182 that serves as a torsion shaft is provided in the torsion shaft accommodating hole 92 of the spool 14. The sub torsion member 182 has a sub torsion member main body 184. In the present embodiment, the sub torsion member main body 184 is formed in the shape of a rod whose cross-sectional shape is circular and whose axial direction is the same direction as the axial direction of the spool 14. A clutch side engaging portion 186 is formed at the end portion, at the second lock mechanism 66 side, of the sub torsion member main body 184.

The outer peripheral shape of the clutch side engaging portion 186 is a non-circular shape, such as a polygonal shape, a star shape, a gear shape, a serrated shape, or the like. An engaging hole 188 is formed in the sleeve 64 in correspondence with this clutch side engaging portion 186. The inner peripheral shape of the engaging hole 188 is made to be the same shape as (strictly speaking, a similar shape that is slightly larger than) the outer peripheral shape of the clutch side engaging portion 186. Due to the clutch side engaging portion 186 being fit into the engaging hole 188, relative rotation of the sleeve 64 with respect to the sub torsion member 182 is restricted.

A spool side engaging portion 190 is provided at the end portion of the sub torsion member main body 184, which end portion is at the side opposite the clutch side engaging portion 186. As shown in FIG. 5, the spool side engaging portion 190 has an engaging portion main body 192 whose outer peripheral shape is larger than the outer peripheral shape of the sub torsion member main body 184. Plural (four in the present embodiment) fit-together projections 194, 196, 198, 200, and a load receiving portion 214, are formed at the engaging portion main body 192.

An engaging hole 202 is formed in the inner peripheral portion of the torsion shaft accommodating hole 92, in correspondence to the spool side engaging portion 190. Rotation restricting holes 204, 206, 208, 210 that serve as rotation restricting portions, and a load imparting portion 218, are formed at this engaging hole 202. Differently than the above-described respective rotation restricting holes 124 through 130, the peripheral direction dimensions of the respective rotation restricting holes 204 through 210 are set to be sufficiently larger than the peripheral direction dimensions of the respective fit-together projections 194 through 200. However, the relationships between inclined surfaces at the take-up direction sides of the rotation restricting holes 204 through 210 and inclined surfaces at the take-up direction sides of the fit-together projections 194 through 200 are set to be the same as the above-described relationships between the inclined surfaces 134 of the fit-together projections 114 through 120 and the inclined surfaces 132 of the rotation restricting holes 124 through 130. Further, the relationship between the load receiving portion 214 and the load imparting portion 218 also is set to be the same as the above-described relationship between the load receiving portion 142 and the load imparting portion 146.

Further, a stopper 232 is provided at the sub torsion member main body 184 of the sub torsion member 182. The stopper 232 is provided with plural fit-in pins 234. These fit-in pins 234 are provided so as to correspond to the gaps between the pull-out direction side surfaces of the above-described fit-together projections 194 through 200 and the pull-out direction side surfaces of the rotation restricting holes 204 through 210. These fit-in pins 234 are fit into the gaps between the pull-out direction side surfaces of the fit-together projections 194 through 200 and the pull-out direction side surfaces of the rotation restricting holes 204 through 210, and restrict relative rotation in the direction in which the take-up direction side inclined surfaces of the fit-together projections 194 through 200 are away from the take-up direction side inclined surfaces of the rotation restricting holes 204 through 210.

At the sub torsion member 182 that is provided with such a spool side engaging portion 190, a screw 222 is provided at the end portion of the clutch side engaging portion 186, which end portion is at the side opposite the sub torsion member main body 184. The screw 222 has a male screw portion 224. The male screw portion 224 is screwed-together with a female screw hole, that is formed in the clutch side engaging portion 186 coaxially with the sub torsion member main body 184, and the screw 222 is mounted integrally to the sub torsion member 182. A shaft portion 226 of the screw 222 is formed coaxially with respect to the male screw portion 224. The shaft portion 226 is supported so as to rotate freely, either directly or indirectly at the housing of the above-described second locking mechanism 66 or at another part that is mounted to the flange portion 16 side leg plate of the frame separately from this housing. Due thereto, the spool 14 is indirectly supported at the frame so as to rotate freely.

<Operation, Effects of Present Embodiment>

The basic operation of the webbing retractor 10 relating to the present embodiment is described next.

(Basic Operation)

For example, when the vehicle enters into a state of rapid deceleration, the "VSIR mechanism" that structures the first locking mechanism 54 operates. Further, when the vehicle decelerates, the body of a vehicle occupant moves inertially toward the vehicle front side. When the webbing 34 that is applied to the body of the vehicle occupant is pulled due thereto, the spool 14 is rotated in the pull-out direction. When the rotational acceleration in the pull-out direction of the spool 14 exceeds a predetermined magnitude, the "WSIR mechanism" that structures the first locking mechanism 54 operates. When the "VSIR mechanism" or the "WSIR mechanism" operates in this way, the lock pawl that structures the first locking mechanism 54 swings and meshes together with a ratchet tooth formed at the outer peripheral portion of the lock base 56. Due thereto, rotation of the lock base 56 in the pull-out direction is restricted.

The lock base side engaging portion 106 of the main torsion member 102 is fit-together with the lock base 56 in a state in which relative rotation with respect to the lock base 56 is restricted. On the other hand, due to the spool side engaging portion 110 of the main torsion member 102 being fit-together with the engaging hole 122, relative rotation with respect to the spool 14 is restricted. Accordingly, relative rotation of the lock base 56 with respect to the spool 14 is restricted. Therefore, due to rotation of the lock base 56 in the pull-out direction being restricted as described above, rotation of the spool 14 in the pull-out direction is restricted, and pulling-out of the webbing 34 from the spool 14 is restricted. Due thereto, the body of the vehicle occupant, that attempts to inertially move toward the vehicle front, can be effectively restrained by the webbing 34.

In this state, when the rotational force in the pull-out direction that is imparted to the spool 14 exceeds the mechanical strength of the main torsion member main body 104 of the main torsion member 102, the spool side engaging portion 110 side is twisted so as to rotate in the pull-out direction, with respect to the lock base side engaging portion 106 side at the main torsion member main body 104. The spool 14 rotates in the pull-out direction by an amount corresponding to the amount of twisting that arises at the main torsion member main body 104. Accordingly, the webbing 34 is pulled-out from the spool 14 by a length that corresponds to the amount of this rotation of the spool 14 in the pull-out direction, and the body of the vehicle occupant can move inertially toward the vehicle front by an amount corresponding to the amount of the pulled-out length of the webbing 34. Further, a portion of the rotational force in the pull-out direction that is imparted to the spool 14, i.e., a portion of the force by which the body of the vehicle occupant pulls the webbing 34, is used for the torsional deformation at the main torsion member main body 104 and is absorbed.

Moreover, this rotation of the spool 14 in the pull-out direction is also relative rotation of the spool 14 with respect to the lock base 56 whose rotation is restricted. Therefore, when the spool 14 rotates in the pull-out direction in this way, the trigger wire 82, whose proximal end portion is anchored on the lock base 56, moves toward the flange portion 18 side. Due thereto, when the distal end of the trigger wire 82 comes-out from the clutch 68, the pawl 70 is displaced by urging force and engages with the ring member at the radial direction outer side.

In this state, if a predetermined condition, such as the body weight of the vehicle occupant or the like for example, is satisfied, rotation of the ring member in the pull-out direction is restricted. Due to rotation of the ring member in the pull-out direction being restricted, rotation of the second locking mechanism 66 in the pull-out direction is restricted, and accordingly, rotation of the sleeve 64 in the pull-out direction is restricted. The clutch side engaging portion 186 of the sub torsion member 182 is fit-together with the engaging hole 188 of the sleeve 64, and relative rotation of the sub torsion member 182 with respect to the sleeve 64 is restricted. Therefore, due to rotation of the sleeve 64 in the pull-out direction being restricted, rotation of the sub torsion member 182 in the pull-out direction is restricted.

Accordingly, in this state, the spool 14 cannot rotate in the pull-out direction if the magnitude of the rotational force in the pull-out direction that is imparted to the spool 14 does not exceed the sum of the mechanical strength of the main torsion member main body 104 at the main torsion member 102 and the mechanical strength of the sub torsion member main body 184 at the sub torsion member 182.

When the magnitude of the rotational force in the pull-out direction that is imparted to the spool 14 exceeds the sum of the mechanical strength of the main torsion member main body 104 at the main torsion member 102 and the mechanical strength of the sub torsion member main body 184 at the sub torsion member 182, torsional deformation arises at both of the main torsion member main body 104 of the main torsion member 102 and the sub torsion member main body 184 of the sub torsion member 182, and larger force (energy) can be absorbed than in a case in which only the main torsion member main body 104 of the main torsion member 102 torsionally deforms.

On the other hand, even in a state in which the distal end of the trigger wire 82 has come-out from the clutch 68 and the pawl 70 is engaged with the ring member, rotation of the ring member in the pull-out direction is not restricted if the predetermined condition, such as the body weight of the vehicle occupant or the like for example, is not satisfied. Accordingly, in this state, the clutch side engaging portion 186 side of the sub torsion member 182 can rotate in the pull-out direction together with the spool 14, and accompanied by the sleeve 64 and accordingly the clutch 68. Therefore, in this state, torsional deformation does not arise at the sub torsion member main body 184 of the sub torsion member 182, and, if the magnitude of the rotational force in the pull-out direction that is imparted to the spool 14 exceeds the mechanical strength of the main torsion member main body 104 at the main torsion member 102, the spool 14 can rotate in the pull-out direction.

When rotational force in the pull-out direction is imparted to the spool 14 in a state in which rotation of the lock base 56 in the pull-out direction is restricted as described above, the respective inclined surfaces 132 at the take-up direction sides of the rotation restricting holes 124 through 130 of the engaging hole 122 push, toward the pull-out direction side, the inclined surfaces 134 at the take-up direction sides of the fit-together projections 114 through 120 of the main torsion member 102. Further, in this state, this pushing force has a component in the rotation tangent direction and a component toward the rotation radius direction central side.

Further, in this state, the load imparting portion 146 of the engaging hole 122 pushes the load receiving surface 144 of the load receiving portion 142 toward the pull-out direction side. This pushing force as well has a component in the rotation tangent direction and a component toward the rotation radius direction central side. Here, the component toward the rotation radius direction central side of the pushing force, that the load imparting portion 146 of the engaging hole 122 imparts to the load receiving surface 144 of the load receiving portion 142, is against (opposes) the components toward the rotation radius direction central side of the pushing forces, that the respective inclined surfaces 132 of the rotation restricting holes 124 through 130 impart to the inclined surfaces 134 of the fit-together projections 114 through 120 (in particular, the component toward the rotation radial central side of the pushing force that the inclined surface 132 of the rotation restricting hole 126 imparts to the inclined surface 134 of the fit-together projection 116).

Therefore, the load balance at the spool side engaging portion 110, at the time when rotational force in the pull-out direction is imparted to the spool side engaging portion 110 of the main torsion member 102 from the spool 14 that attempts to rotate in the pull-out direction, improves, and displacement toward the webbing insert-through hole 32 at the spool side engaging portion 110 can be suppressed.

On the other hand, as compared with the fit-together projections 114 through 120, the projecting dimension of the load receiving portion 142 from the engaging portion main body 112 is set to be small such that the distal end side does not enter into the webbing insert-through hole 32. Here, the angle θ2, that the above-described imaginary line L3 and imaginary line L4 form, is set to be smaller than the angle θ1 that the above-described imaginary line L1 and imaginary line L2 form.

Therefore, the gap between the root side of the load receiving portion 142 and the engaging hole 122 is small as compared with the gaps between the root sides of the fit-together projections 114 through 120 and the engaging hole 122. Thus, when the spool 14 attempts to rotate in the pull-out direction and the rotation restricting hole 124 through the rotation restricting hole 130 abut the distal end sides of the fit-together projections 114 through 120, the load imparting portion 146 can be made to abut the load receiving surface 144 of the load receiving portion 142, and load in the pull-out direction can be transmitted from the load imparting portion 146 to the load receiving portion 142.

Further, although detailed description is omitted, the relationship between the spool side engaging portion 190 of the sub torsion member 182 and the engaging hole 202 is set to be basically similar to the relationship between the spool side engaging portion 110 of the main torsion member 102 and the engaging hole 122. Therefore, operation, that is similar to the operation that takes place between the spool side engaging portion 110 of the main torsion member 102 and the engaging hole 122, takes place as well between the spool side engaging portion 190 of the sub torsion member 182 and the engaging hole 202. Accordingly, effects, that are similar to the effects that are obtained between the spool side engaging portion 110 of the main torsion member 102 and the engaging hole 122, can be obtained as well between the spool side engaging portion 190 of the sub torsion member 182 and the engaging hole 202.

What is claimed is:

1. A webbing retractor comprising:
    a spool in which a webbing insert-through hole through which a webbing is inserted and a torsion shaft accommodating hole which passes through the spool along a central axis of the spool and in which a torsion shaft is accommodated are formed, in which
        both ends of the webbing insert-through hole are open at an outer peripheral surface of the spool,
        the webbing which is inserted-through from one end of the webbing insert-through hole is anchored at another end of the webbing insert-through hole,
        the webbing insert-through hole communicates with the torsion shaft accommodating hole,
        rotation restricting portions, whose inner peripheral shape is a concave shape that opens toward the central axis, are formed at at least a portion of the torsion shaft accommodating hole, and
        a load imparting portion, that is inclined inwardly in a radial direction whose center is the central axis with respect to an around direction of the central axis, is formed at a communication portion at an inner peripheral portion of the webbing insert-through hole with an inner peripheral portion of the torsion shaft accommodating hole;
    a locking unit that has a lock base that rotates relative to the spool, and that restricts, by operating, rotation of the lock base in a direction corresponding to a pull-out direction that is a rotating direction of the spool when the webbing is pulled-out from the spool; and
    wherein the torsion shaft has a portion at one end side connected to the lock base in a state in which relative rotation with respect to the lock base is restricted, and at which fit-together projections and a load receiving portion are formed at an end portion of the torsion shaft which is at the another end side of the torsion shaft opposite from the portion of the torsion shaft connected to the lock base, in which
        the fit-together projections are formed to project-out from an outer peripheral portion of a main body portion of the torsion shaft so as to fit-in the rotation restricting portions respectively, and
        a part of an outer peripheral surface of an outer peripheral portion of the load receiving portion is inclined outwardly in the radial direction with respect to the around direction, and the load receiving portion is formed to project-out from the outer peripheral portion of the main body portion so as to face the load imparting portion,
    wherein a maximum projecting dimension in the radial direction of the load receiving portion from the outer peripheral portion of the main body portion of the torsion shaft is set to be shorter than a maximum projecting dimension in the radial direction of the fit-together projection from the outer peripheral portion of the main body portion of the torsion shaft.

2. The webbing retractor of claim 1, wherein, when seen along the central axis, a fit-together projection side first imaginary line, a fit-together projection side second imaginary line, a load receiving portion side first imaginary line, and a load receiving portion side second imaginary line are defined such that:
    the fit together projection side first imaginary line connects a fit-together projection side intersection point, that is a point of intersection of the outer peripheral portion of the main body portion of the torsion shaft and an outer peripheral portion of the fit-together projection, and the central axis,
    the fit-together projection side second imaginary line connects a fit-together projection side contact point, that is a point of contact of the outer peripheral portion of the fit-together projection and an inner peripheral portion of the rotation restricting portion, and the fit- together projection side intersection point,
    the load receiving portion side first imaginary line connects a load receiving portion side intersection point, that is a point of intersection of the outer peripheral portion of the main body portion of the torsion shaft and the outer peripheral portion of the load receiving portion, and the central axis,
    the load receiving portion side second imaginary line connects a load receiving portion side contact point, that is a point of contact of the outer peripheral portion of the load receiving portion and an inner peripheral portion of the load imparting portion, and the load receiving portion side intersection point, and
    an angle, that the load receiving portion side first imaginary line and the load receiving portion side second imaginary line form, is set to be smaller than an angle that the fit-together projection side first imaginary line and the fit-together projection side second imaginary line form.

3. The webbing retractor of claim 2, wherein a distal end in a projecting direction of the load receiving portion does not project-out further toward an inner side of the webbing insert-through hole than a surface of the webbing insert-through hole, which surface is at the central axis side of the spool.

4. The webbing retractor of claim 2, wherein the load receiving portion includes, as the portion of the outer peripheral surface thereof, a load receiving surface which is an inclined surface formed at a side of a take-up direction opposite to the pull-out direction, and the load receiving surface faces the load imparting portion.

5. The webbing retractor of claim 1, wherein a distal end in a projecting direction of the load receiving portion does not project-out further toward an inner side of the webbing insert-through hole than a surface of the webbing insert-through hole, which surface is at the central axis side of the spool.

6. The webbing retractor of claim 1, wherein the fit-together projections and the load receiving portion are formed at the torsion shaft so as to be separated from each other in a circumference direction of the torsion shaft such that gaps are respectively formed therebetween in the circumference direction.

7. The webbing retractor of claim 1, wherein the load receiving portion includes, as the portion of the outer peripheral surface thereof, a load receiving surface which is an inclined surface formed at a side of a take-up direction opposite to the pull-out direction, and the load receiving surface faces the load imparting portion.

8. A webbing retractor comprising:
  a spool in which a webbing insert-through hole through which a webbing is inserted and a torsion shaft accommodating hole which passes through the spool along a central axis of the spool and in which a torsion shaft is accommodated are formed, in which
    both ends of the webbing insert-through hole are open at an outer peripheral surface of the spool,
    the webbing which is inserted-through from one end of the webbing insert-through hole is anchored at another end of the webbing insert-through hole,
    the webbing insert-through hole communicates with the torsion shaft accommodating hole,
    rotation restricting portions, whose inner peripheral shape is a concave shape that opens toward the central axis, are formed at at least a portion of the torsion shaft accommodating hole, and
  a load imparting portion, that is inclined inwardly in a radial direction whose center is the central axis with respect to an around direction of the central axis, is formed at a communication portion at an inner peripheral portion of the webbing insert-through hole with an inner peripheral portion of the torsion shaft accommodating hole;
  a locking unit that has a lock base that rotates relative to the spool, and that restricts, by operating, rotation of the lock base in a direction corresponding to a pull-out direction that is a rotating direction of the spool when the webbing is pulled-out from the spool; and
  wherein the torsion shaft has a portion at one end side connected to the lock base in a state in which relative rotation with respect to the lock base is restricted, and at which fit-together projections and a load receiving portion are formed at an end portion of the torsion shaft so as to be separated from each other in a circumference direction of the torsion shaft such that gaps are respectively formed therebetween in the circumference direction, in which
    the fit-together projections are formed to project-out from an outer peripheral portion of a main body portion of the torsion shaft so as to fit-in the rotation restricting portions respectively, and
    a part of an outer peripheral surface of an outer peripheral portion of the load receiving portion is inclined outwardly in the radial direction with respect to the around direction, and the load receiving portion is formed to project-out from the outer peripheral portion of the main body portion so as to face the load imparting portion,
  wherein a projecting dimension in the radial direction of the load receiving portion from the outer peripheral portion of the main body portion of the torsion shaft is set to be shorter than a projecting dimension in the radial direction of the fit-together projection from the outer peripheral portion of the main body portion of the torsion shaft.

* * * * *